(12) United States Patent
Dor et al.

(10) Patent No.: US 8,112,048 B2
(45) Date of Patent: *Feb. 7, 2012

(54) METHOD AND APPARATUS TO MANAGE POWER CONSUMPTION OF A SEMICONDUCTOR DEVICE

(75) Inventors: Amit Dor, Raanana (IL); Charles Roth, Austin, TX (US); Mark Fullerton, Austin, TX (US)

(73) Assignee: Marvell World Trade Ltd., St. Michael (BB)

( * ) Notice: Subject to any disclaimer, the term of this patent is extended or adjusted under 35 U.S.C. 154(b) by 846 days.

This patent is subject to a terminal disclaimer.

(21) Appl. No.: 12/127,678

(22) Filed: May 27, 2008

(65) Prior Publication Data

US 2008/0224685 A1    Sep. 18, 2008

Related U.S. Application Data

(63) Continuation of application No. 11/014,805, filed on Dec. 20, 2004, now Pat. No. 7,379,718.

(51) Int. Cl.
*H04B 1/16* (2006.01)
(52) U.S. Cl. ...................................... 455/127.1
(58) Field of Classification Search .............. 455/550.1, 455/574, 127.1, 127.2, 127.3, 127.4, 343.1, 455/343.2, 343.4; 713/320, 322, 501
See application file for complete search history.

(56) References Cited

U.S. PATENT DOCUMENTS

| | | | |
|---|---|---|---|
| 6,425,086 B1 * | 7/2002 | Clark et al. | 713/322 |
| 6,996,730 B2 | 2/2006 | Bonnett | |
| 2003/0109967 A1 | 6/2003 | Cooper | |
| 2004/0128090 A1 | 7/2004 | Read et al. | |

FOREIGN PATENT DOCUMENTS

| | | |
|---|---|---|
| EP | 0978781 A2 | 7/1999 |
| EP | 0 978 781 A2 | 2/2002 |
| EP | 1 422 595 A2 | 5/2004 |
| EP | 1422595 A2 | 5/2004 |
| JP | 2000-66776 A | 3/2000 |
| JP | 2002-529806 A | 9/2002 |
| JP | 2004-178588 A | 6/2004 |
| JP | 2004-228417 | 8/2004 |
| WO | 00/26747 A1 | 5/2000 |
| WO | WO00/26747 A1 | 5/2000 |
| WO | WO03/021409 A2 | 3/2003 |
| WO | 03/062972 A2 | 7/2003 |
| WO | WO2004/061635 A2 | 7/2004 |

* cited by examiner

*Primary Examiner* — Thanh Le

(57) ABSTRACT

Briefly, a method an apparatus of a power management system of a semiconductor device capable of managing a power consumption of the semiconductor device by varying an operating voltage of the semiconductor device according to a voltage value based on a reference number.

22 Claims, 4 Drawing Sheets

METHOD AND APPARATUS TO MANAGE POWER CONSUMPTION OF A SEMICONDUCTOR DEVICE

CROSS-REFERENCE TO RELATED APPLICATIONS

This present application is a continuation of U.S. Pat. No. 7,379,718 issued May 27, 2008 titled "METHOD AND APPARATUS TO MANAGE POWER CONSUMPTION OF A SEMICONDUCTOR DEVICE." The specification of said patent is hereby incorporated in its entirety, except for those sections, if any, that are inconsistent with this specification.

BACKGROUND OF THE INVENTION

Semiconductor devices are commonly referred to in the art as "chips". Some semiconductor devices may include microelectronic systems. For example, a system-on-chip (SOC) may include a graphic controller, a processor, a modem, one or more wireless communication units, an input/output interface unit, a display controller, a digital signal processor, one or more memories, or the like. Systems-on-chip may be used, for example, in battery operated devices and/or low power devices, and may include a dynamic voltage management (DVM) mechanism to control a power consumption of system-on-chip or other elements of the battery operated and/or low power device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
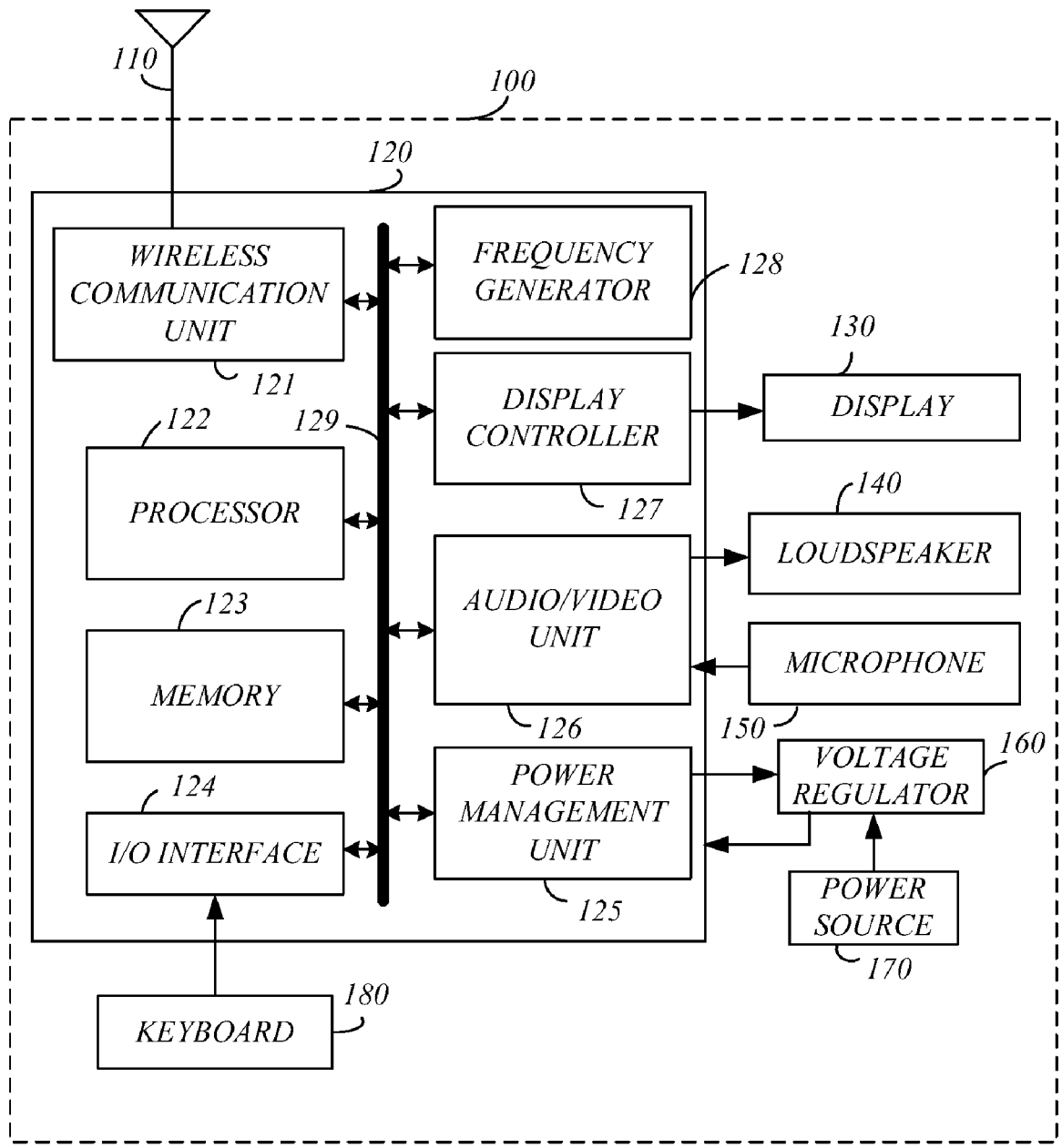
FIG. 1 is a schematic illustration of a wireless communication device according to exemplary embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as, for example a hand held devices, battery operated devices wireless communication devices of a radio system and the like. Wireless communication devices intended to be included within the scope of the present invention include, by way of example only, wireless local area network (WLAN) devices, two-way radio devices, digital radio devices, analog radio devices, cellular radiotelephone devices and the like.

Types of hand held devices intended to be within the scope of the present invention include, although are not limited to, tablet computers, personal data assistance (PDA), portable electronic mail (Email) device, or the like.

Some embodiments of the invention may be implemented, for example, using a machine-readable medium or article which may store an instruction or a set of instructions that, if executed by a machine (for example, by stations of wireless communication system, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Turning to FIG. 1, a wireless communication device 100 in accordance with exemplary embodiments of the invention is shown. Although the scope of the present invention is not limited in this respect, wireless communication device 100 may be a cellular mobile device, a wireless device of a wireless local area network (WLAN) and/or a wireless metropolitan area network (WPAN) such as, for example, an access point, a wireless personal digital assistant (PDA), a mobile computer, a mobile data terminal, and the like.

According to the exemplary embodiment shown in FIG. 1, wireless communication device 100 may include an antenna 110, a semiconductor device 120, a display 130, a speaker 140, a microphone 150, a voltage regulator 160, a power source 160, and a keyboard 180, although the scope of the present invention is in no way limited to this exemplary embodiment of the invention.

Although the scope of the present invention is not limited in this respect, in some embodiments of the invention, semiconductor device 120 may include a system on chip (SOC), which may be capable of performing at least some tasks of a mobile communication device. For example, semiconductor device 120 may include a wireless communication unit 121 capable of operating in a cellular radiotelephone system and/or in a WLAN and/or in a WPAN and/or in piconets and/or in other like systems or networks. In addition, semiconductor device 120 may include a processor 122, a memory 123, an input/output (I/O) interface unit 124, a power management unit 125, an audio/video unit 126, a display controller 127 and a frequency generator 128.

Although the scope of the present invention is not limited in this respect, antenna 110 may include one or more antennas and the antennas may include an internal antenna, an antenna array, a dipole antenna, a multi-poles antenna, a multi directional antenna or the like. In some embodiments of the invention, antenna 110 may be operably coupled to the wireless communication unit 121 and may receive and/or transmit modulated radio frequency (RF) signals. Processor 122 may include a digital signal processor (DSP) and/or other type of processor and may be operably connected by a bus 129 to the other units of semiconductor device 120, if desired.

In some exemplary embodiments of the present invention, I/O interface unit 124 may be operably coupled to keyboard 180 and may transfer keyboard strokes to processor 122, if desired. Memory 123 may include a Flash memory and/or any other desired type of memory and may be capable of storing applications, operating systems, temporary data values or the like. Audio/Video unit 126 may be coupled to loudspeaker 140 and microphone 150 and may process audio signals. In addition, in some other embodiments of the invention audio/video unit 126 may include a graphic processor and may be coupled to a camera or video camera (not shown) and may be able to process images and/or video which may be displayed on display 130, if desired. Display controller 127 may control display 130, which may include a liquid crystal display and/or any other type of graphic or alphanumeric display, if desired.

Although the scope of the present invention is not limited in this respect, frequency generator 128 may generate a desired clock frequency of semiconductor device 120. According to some embodiments of the invention the clock frequency may be varied to control a power consumption of semiconductor device 120. Power management unit 125 may receive from bus 129 a reference number, which may be related to the clock frequency and may be used as a basis for varying an operating voltage of semiconductor device 120 by converting the reference number to a voltage value. Power management unit 125 may provide the voltage value to voltage regulator 160 which may set the voltage of semiconductor device 120 according to this value, if desired.

Although the scope of the present invention is not limited in this respect, in some embodiment of the invention semiconductor device 120 may include a software and/or hardware and/or any combination of hardware and software that may translate a required operating frequency of the semiconductor device 120 into corresponding reference numbers related to a required operating frequency and/or a required operating voltage level of the semiconductor device. The reference numbers may be further manipulated by software and/or hardware and/or any combination of hardware and software to provide a required voltage value, if desired.

Figure 2:
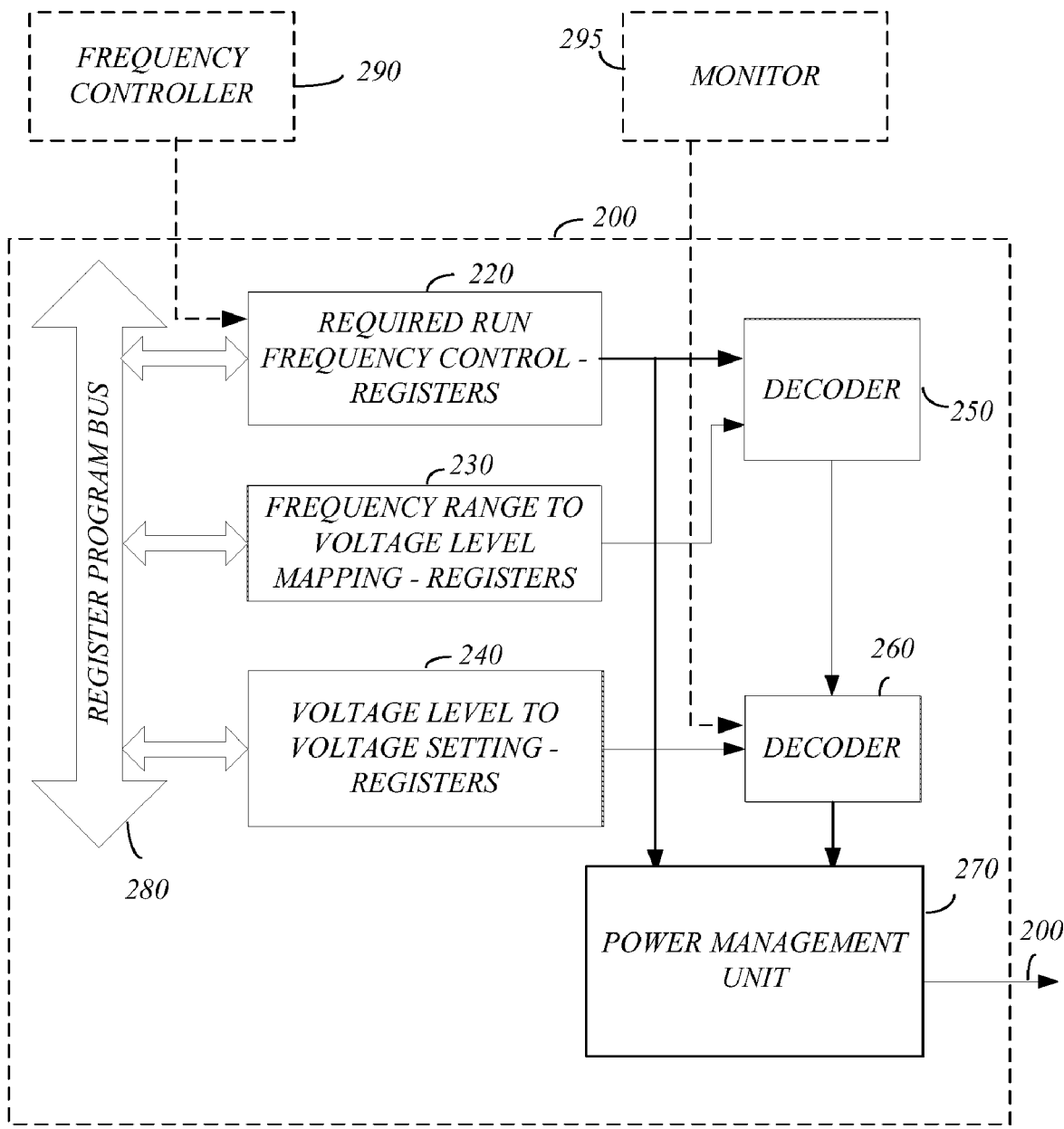
FIG. 2 is a schematic block diagram of a power management system according to exemplary embodiments of the invention.

Turning to FIG. 2, a block diagram of a portion of a power management system 200 according to an exemplary embodiment of the invention is shown. Although the scope of the present invention is not limited in this respect, power management system 200 may be capable of controlling power consumption of semiconductor device 120. In this exemplary embodiment of the invention, power management system 200 may be implemented within semiconductor device 120. It should be understood that power management system 200 may be implemented by hardware and/or software and/or any suitable combination of hardware and software.

Although the scope of the present invention is not limited in this respect, power management system 200 may include one or more frequency control registers 220, which may control an operating frequency of semiconductor device 120; one or more mapping registers 230, which may map a frequency range to a voltage level; one or more voltage setting registers 240, which may set the voltage level to a voltage value; a voltage level decoder 250; a voltage value decoder 260; and a power management unit 270.

Although the scope of the present invention is not limited to this respect, it should be understood that in some embodiments of the present invention, memories and/or look up tables and/or a software functions and/or hardware units and the like may be used to fulfill functions of frequency control registers 220, mapping registers 230 and voltage setting registers 240, although the scope of the present invention is not limited in this respect.

Although the scope of the present invention is not limited in this respect, in some embodiments of the invention, a bus 280 may provide values from different units of semiconductor device 120 to registers 220, 230 and 240. For example, processor 122 of FIG. 1 may provide a required operating frequency value to frequency control registers 220. Frequency control registers 220 may provide the required operating frequency value to frequency generator 128, which may set the required operating frequency of semiconductor device 120. In addition, frequency control registers 220 may provide the required operating frequency value to power management unit 270 and to decoder 250.

Additionally or alternatively, the semiconductor device may include two or more processors and/or other units that may require different operating frequencies, which may be provided to frequency control registers 220, if desired.

According to one exemplary embodiment of the invention, processor 122 may provide a range of frequency values to mapping registers 230. Mapping registers 230 may map a range of frequency values to a required voltage level. For example, the required voltage level value may be a reference number related to a voltage level, e.g., high, medium or low voltage levels. In another exemplary embodiment, the reference number may be related to first, second, third, forth voltage level and the like. Mapping registers 230 may match between a range of frequencies and the reference number that relates to the voltage level, if desired. Voltage level decoder 250 may assign a reference number to the required voltage level according to the required operating frequency.

Although the scope of the present invention is not limited in this respect, setting registers 240 may match one or more voltage values to the required voltage level and may provide a matched voltage value to voltage value decoder 260, if desired. Voltage value decoder 260 may decode the required voltage value from the reference number (e.g. the required voltage level) and the matched voltage value. According to some embodiments of the invention, power management unit 270 may receive the required voltage and the required operating frequency and may set an external voltage regulator (e.g. voltage regulator 160) to provide the required voltage to semiconductor device 120.

Although the scope of the present invention is not limited in this respect, for example, an operating voltage range of semiconductor device may include a sub-range of a 0.5V to 1.8V range. An operating frequency range may vary, e.g., from a few MHz to about one Gigahertz, if desired. In some embodiments of the invention, the power may be calculated according to the formula $\frac{1}{2}*C*V^2*F$, where C may be the charged capacitance on every toggle of a gate of semiconductor device 120, V may represent a supply voltage of semiconductor device 120 and F may represent an operating frequency, although the scope of the present invention is not limited in this respect.

According to some other embodiments of the present invention, a frequency controller 290 may provide a required frequency value to frequency control registers 220 (shown with dotted line). Frequency controller 290, which may include a hardware unit, may monitor the power consumption of units and/or components and/or cores of semiconductor device 120, and may vary frequencies of those units and/or components and/or cores to the required frequency, although the scope of the present invention is not limited in this respect.

In addition, a monitor 295 (shown with dotted line) may monitor a temperature of the semiconductor device, a process skew or any other property that may be determined, e.g., automatically, by circuits of the semiconductor device. Monitor 295 may provide indications of the monitored properties to decoder 260 which may decode the required voltage value according to the required voltage level. Voltage value decoder 260 may be capable of manipulating a reference number with the one or more monitored properties, although the scope of the present invention is not limited in this respect.

Figure 3:
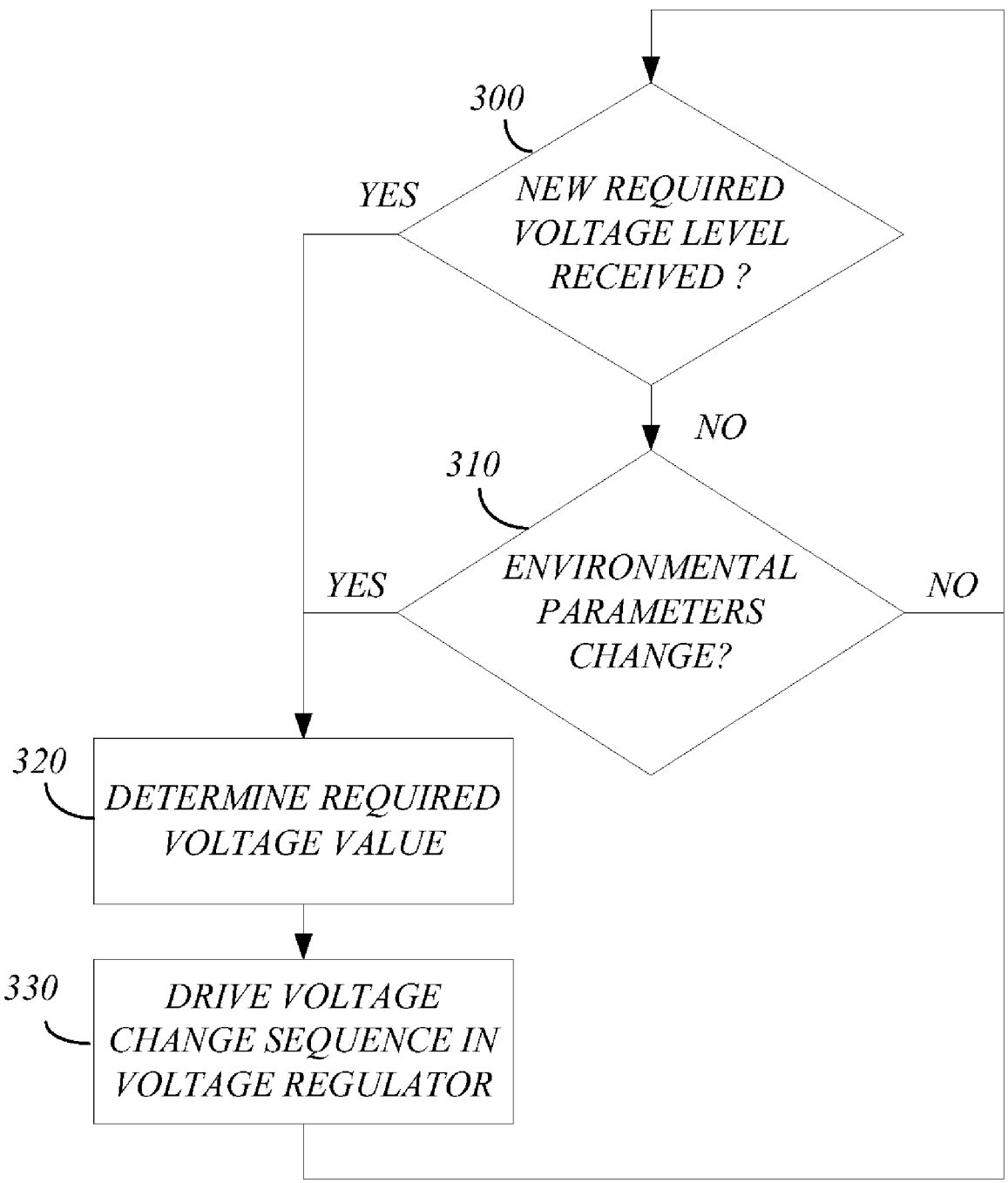
FIG. 3 is a schematic flowchart of a method to vary an operating voltage of a semiconductor device according to one exemplary embodiment of the invention.

Turning to FIG. 3, a flowchart of a method to vary an operating voltage of a semiconductor device according to exemplary embodiments of the present invention is shown. Although the scope of the present invention is not limited in this respect, for example, power management system 200 may employ one or more methods and/or algorithms and/or mechanisms to vary the operating voltage of semiconductor device 120, if desired.

According to one embodiment of the invention, power management system 200 may receive a required voltage level e.g., from decoder 250 (text block 300). For example, the request may come when for example, an operating frequency have been changed, or if one or more environmental parameters such as, for example a temperature has been changed (text block 310). The required voltage value may be determined, for example, by decoder 260 (text block 320), and power management unit 270 may drive a voltage change sequence to be executed by an external voltage regulator, for example, voltage regulator 160 of FIG. 1, if desired (text block 330).

Figure 4:
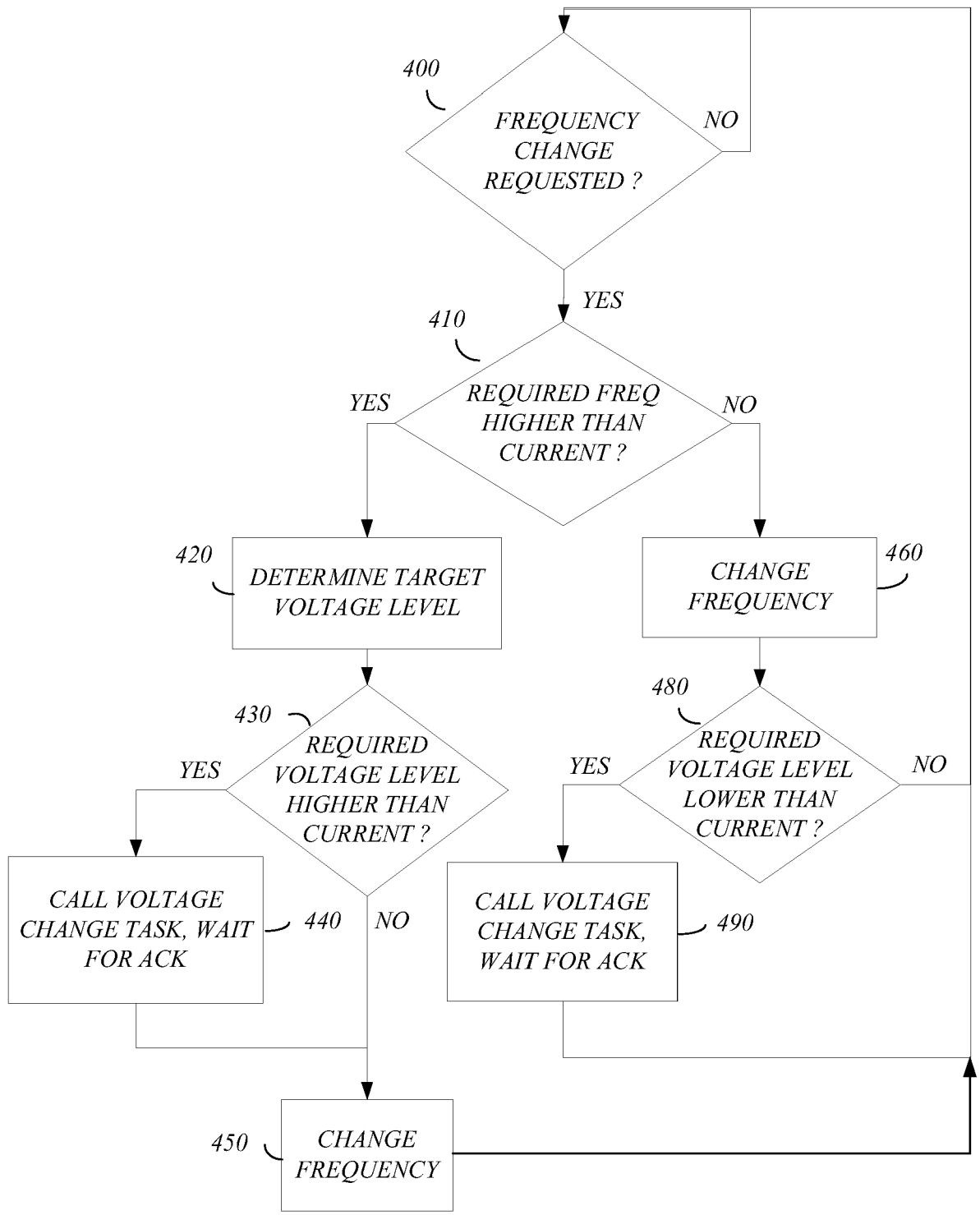
FIG. 4 is a schematic flowchart of a method to vary an operating voltage of a semiconductor device according to another exemplary embodiment of the present invention.

Turning to FIG. 4, a flowchart of a method to vary an operating voltage of a semiconductor device according to another exemplary embodiment of the present invention is shown. Although the scope of the present invention is not limited in this respect, the semiconductor device may include a system on a chip, for example, on semiconductor device 120 of FIG. 1. Furthermore, the semiconductor device may include a processor (e.g. processor 122) that may operate a software application to control power consumption characteristics of the semiconductor device (e.g. semiconductor device 120). In one embodiment of the invention, the software application may request a frequency change and, in some embodiments of the invention, a frequency change request may be made by hardware, if desired (text block 400). A power management system of the semiconductor device may determine if the required frequency change may be higher then an operating frequency of the semiconductor device (text block 410). For example, in some embodiments of the invention the software may use frequency control registers (e.g. frequency control registers 220) to vary the frequency, if desired.

According to some embodiments of the invention, the power management system may determine the required voltage level (text box 420) and, if the required voltage level is higher then a current voltage level (text box 430), the software and or the hardware may call a voltage change task (text box 430). For example, in some embodiments of the invention the voltage change task may control a power management unit (e.g. power management unit 270) to change the voltage of the semiconductor device. In this exemplary embodiment of the invention, the method may end by changing the operating frequency of the semiconductor device to the required frequency (text box 450). For example, the software application may set frequency generator 128 of FIG. 1 to the required frequency, if desired.

Although the scope of the present is not limited to this exemplary embodiment of the invention, the required frequency may be lower than the operating frequency (text box 410) and the software may change the operating frequency to the required frequency (text box 460). According to this embodiment of the invention, the required frequency level may be lower then the current frequency level (text box 480) and the software may call the voltage change task to change the voltage of the semiconductor device according to the required voltage level (text box 490). In some embodiments of the invention the voltage change task may wait for an acknowledge (ACK) signal from the power management unit (e.g. power management unit 220) as is shown in text blocks 440 and 450 although the scope of the present invention is not limited in this respect.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method for setting an operating frequency and an operating voltage of a semiconductor device, wherein the operating voltage of the semiconductor device is set by a voltage regulator that is external to the semiconductor device, the method comprising:
    monitoring a property of the semiconductor device;
    setting the operating frequency of the semiconductor device at a first frequency value; and
    translating the first frequency value into a voltage level,
    wherein the voltage regulator generates the operating voltage for the semiconductor device based on i) the first frequency value and ii) the voltage level, and
    wherein the translating the first frequency value into the voltage level comprises assigning a reference number to the first frequency value,
        manipulating the reference number based on the monitored property of the semiconductor device, and
        converting the manipulated reference number into the voltage level.

2. The method of claim 1, wherein monitoring the property of the semiconductor device comprises monitoring a temperature of the semiconductor device.

3. The method of claim 1, wherein monitoring the property of the semiconductor device comprises monitoring a process skew of the semiconductor device.

4. The method of claim 1, wherein:
    setting the operating frequency of the semiconductor device at the first frequency value comprises setting a component of the semiconductor device to operate at the first frequency value; and
    the voltage regulator is configured to generate the operating voltage for the component of the semiconductor device.

5. The method of claim 1, wherien the component of the semiconductor device is one or more of a processor, a modem, a graphic controller, a wireless communication unit, a display controller, a digital signal processor, and a memory.

6. A semiconductor device comprising:
    a power management unit capable of managing a power consumption of a semiconductor device by varying an operating voltage of the semiconductor device according to a required voltage value based on a reference number, wherein the reference number is related to one or more voltage levels; and
    a voltage level decoder to decode a required voltage level and an operating frequency of the semiconductor device to provide the reference number.

7. The semiconductor device of claim 6, wherein the voltage level decoder is capable of decoding the required voltage level and operating frequencies of two or more units of the semiconductor device to provide the reference number.

8. The semiconductor device of claim 7, wherein the voltage level decoder is capable of manipulating the reference number with a property of the semiconductor device to provide the required voltage value.

9. The semiconductor device of claim 6, further comprising:
    a voltage value decoder to decode the reference number and to produce the required voltage value according to the required voltage level.

10. An apparatus comprising:
    a power management unit configured to vary a voltage of the apparatus according to a required voltage value related to a reference number based on a required voltage level, wherein the required voltage level is related to a required operating frequency of the apparatus;
    one or more frequency control registers to provide a required operating frequency value; and
    a voltage level decoder to assign the reference number to the required operating frequency value.

11. The apparatus of claim 10, further comprising:
    one or more setting registers to match one or more voltage values to the required voltage level to provide a matched voltage value; and
    a voltage value decoder to decode the required voltage value from the reference number and the matched voltage value.

12. The apparatus of claim 11, wherein the voltage value decoder is capable of manipulating the reference number with one or more properties of the apparatus to produce the required voltage value.

13. A hand held device comprising:
    a voltage regulator to provide a voltage value of a semiconductor device;
    one or more frequency control registers to provide a required operating frequency value; and
    a voltage level decoder to assign a reference number to a required voltage level according to the required operating frequency value;
    wherein the semiconductor device includes a power management unit configured to vary a voltage of the voltage regulator according to a required voltage value related to the reference number based on the required voltage level; and
    wherein the required voltage level is related to a required operating frequency of the apparatus.

14. The hand held device of claim 13, wherein the semiconductor device further comprises:
    one or more setting registers to match one or more voltage values to the required voltage level to provide a matched voltage value; and
    a voltage value decoder to decode the required voltage value from the reference number and the matched voltage value.

15. The hand held device of claim 14, wherein the voltage value decoder is capable of manipulating the reference number with one or more properties of the semiconductor device to produce the voltage value.

16. An apparatus comprising:
    a semiconductor device, wherein the semiconductor device includes
        a monitor configured to monitor a property of the semiconductor device,
        a frequency generator configured to set an operating frequency of the semiconductor device at a first frequency value,
        a mapping register configured to translate the first frequency value into a reference number, wherein the reference number corresponds to a voltage level; and
    a voltage regulator configured to generate an operating voltage for the semiconductor device based on i) the first frequency value and ii) the voltage level,
    wherein the semiconductor device further comprises a voltage decoder configured to manipulate the reference number based on the monitored property of the semiconductor device.

17. The apparatus of claim 16, wherein the property of the semiconductor device corresponds to a temperature of the semiconductor device.

18. The apparatus of claim 16, wherein the property of the semiconductor device corresponds to a process skew of the semiconductor device.

19. The apparatus of claim 16, wherein the semiconductor device comprises one or more of a processor, a modem, a graphic controller, a wireless communication unit, a display controller, a digital signal processor, and a memory.

20. A device comprising the apparatus of claim 16.

21. The device of claim 20, wherein the device is a battery operated device.

22. The device of claim 21, wherein the device comprises a wireless communication device.

\* \* \* \* \*